Dec. 12, 1950  W. W. FARIS  2,534,114
GROWING FEEDER FOR POULTRY
Filed Jan. 26, 1946
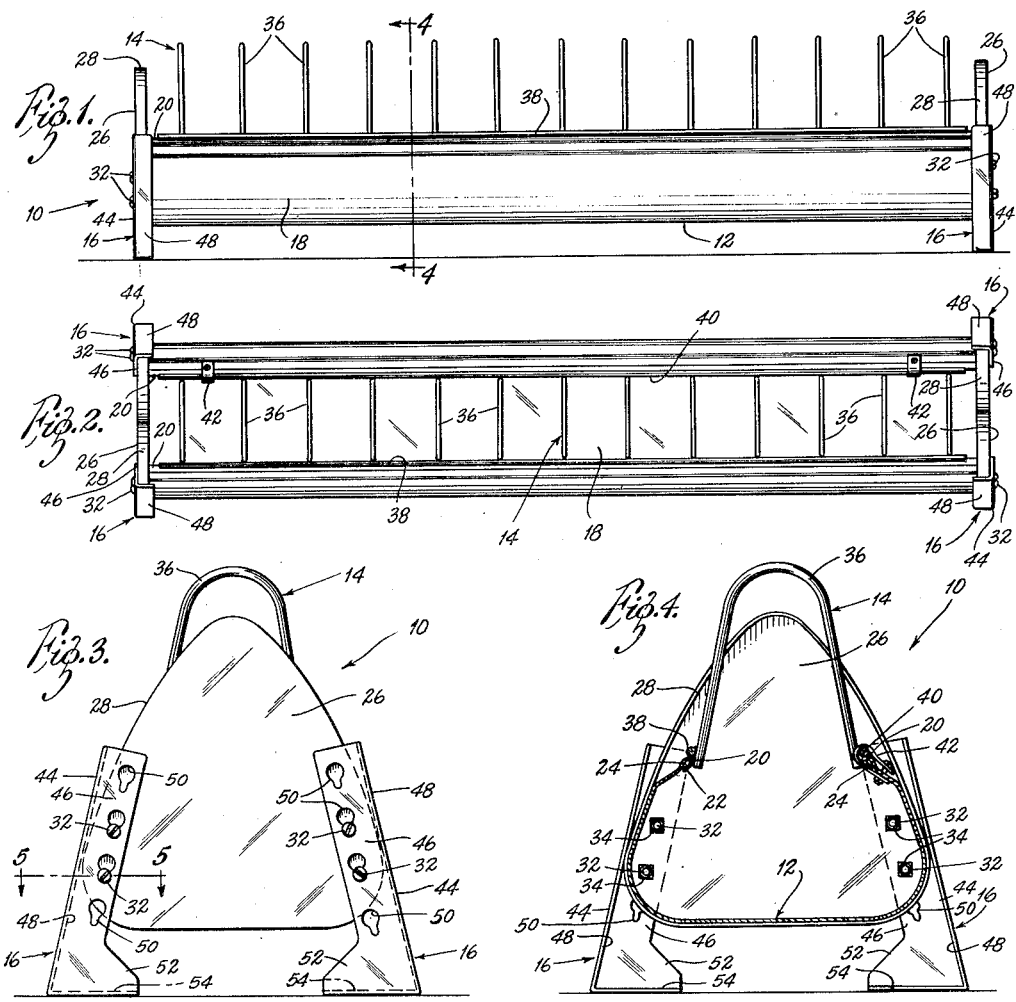
INVENTOR:
WILLIAM W. FARIS,
By Kingsland, Rogers & Ezell
ATTORNEYS.

Patented Dec. 12, 1950

2,534,114

UNITED STATES PATENT OFFICE 2,534,114

GROWING FEEDER FOR POULTRY

William W. Faris, Webster Groves, Mo.

Application January 26, 1946, Serial No. 643,713

1 Claim. (Cl. 119—61)

The present invention relates generally to poultry equipment, and more particularly to a novel growing feeder construction.

Heretofore, numerous types of growing feeders for poultry have been constructed but such have been found deficient in respect to the supporting means therefor and in the trough construction, particularly in respect to the cleaning of the trough edges. The present invention overcomes the difficulties existing in prior constructions.

Therefore, an object of the present invention is to provide a novel support construction for a growing feeder for poultry which incorporates ready adjustment features.

Another object is to provide a novel supporting construction for a growing feeder for poultry whereby the feeder may be supported on wire mesh, piled straw, or the like, as well as on a solid foundation.

Another object is to provide novel supporting construction for a growing feeder for poultry which is so related to the trough of the feeder as to encourage its use as an adjustable supporting means for the trough.

Another object is to provide a novel edge construction for the trough of a growing feeder for poultry which can be readily cleaned and sterilized.

Other objects are to provide a novel supporting construction for a growing feeder for poultry which is sturdy in construction, which is simple to manipulate, which is economical to manufacture, and which is readily constructed.

The foregoing and other objects and advantages are apparent from the following description taken from the accompanying drawing, in which:

Fig. 1 is a side elevational view of a growing feeder for poultry incorporating support and trough features constructed in accordance with the teachings of the present invention;

Fig. 2 is a top plan view of the feeder shown in Fig. 1;

Fig. 3 is an enlarged end view of the feeder shown in Fig. 1;

Fig. 4 is an enlarged vertical sectional view on the line 4—4 of Fig. 1; and

Fig. 5 is an enlarged fragmentary sectional view on the line 5—5 of Fig. 3.

Referring to the drawing more particularly by reference numerals, 10 indicates generally a poultry growing feeder constructed to embody the principles of the present invention.

Broadly, the feeder 10 includes a trough 12, a wire grill 14 hinged to the trough 12, and leg members 16 adjustably connected to the trough 12.

The trough 12 is constructed of suitable metal, such as heavy galvanized steel, and includes a body portion 18 of substantially horseshoe transverse cross section (Fig. 4) having longitudinal edges 20 formed by turning back a portion 22 of the body metal. The turned-back portion 22 is spaced from the main wall of the body portion 18 to provide a longitudinal opening or recess 24. An end member 26 of the configuration shown having a peripheral flange 28 is secured to each end of the body portion 18 by spot welding, or the like. Each end member 26 has a pair of spaced apertures 30 along each vertical edge, each aperture 30 receiving a bolt 32 and a nut 34 (Fig. 5) for a purpose described below.

The wire grill 14 comprises a plurality of U-shaped members 36 preferably of heavy gauge galvanized wire. The U-shaped members 36 are secured together to form the grill by longitudinally disposed members 38 and 40 welded or otherwise secured thereto near the free ends of the legs of the U-shaped members. The grill 14 is pivotally connected to the body portion 18 of the trough 12 by spaced hinges 42 which, as shown, are in the form of metal straps encircling the longitudinal member 40 and bolted to the body portion 18, with the longitudinal member 40 abutting and in superimposed relation to the associated longitudinal edge 20. The U-shaped members 36 are of a width at the free ends so that the longitudinal member 38 rests on its adjacent longitudinal edge 20 when the grill 14 is in operative position (Fig. 4). The grill 14 may be readily removed after installation by removing the bolts of the hinges 42.

The trough 12 is supported by four leg members 16 of heavy galvanized steel, which are of identical construction except for right and left-hand members, and, therefore, only one is described below in detail. Each leg member 16 includes an upstanding attaching portion 44 in the form of an angle bar having an end face 46 and a side face 48. The end face 46 has a plurality of aligned spaced keyhole slots 50 which are adapted to selectively engage the bolts 32. The end face 46 is enlarged at 52, as shown in the drawing. Each leg member 16 also includes a base portion 54, which is preferably formed integral with the end face 46 of the upstanding portion 44. The base portion 54 is in the form of a flat plate of substantial supporting area, being of a length equal to the width of the end face 46 plus the enlargement 52 and of a width equal to the width of the side face 48. The base portion 54 forms with the side face 48 an acute angle, as is shown in the drawing.

It is manifest from the foregoing and from the drawing that the bottom of the trough 12 can be disposed at a selected distance from the supporting surface by means of the adjustable leg members 16. Sufficient keyhole slots 50 are provided in the leg members 16, and the bolts 32 with their nuts 34 are so disposed in the end members 26, that the first adjustment stage of the leg members 16 places the trough 12 substantially on the supporting surface, which is the normal position for feeding new-born chicks, and the like. As the chicks, or the like, grow, the trough 12 is raised from the supporting surface from time to time simply by loosening the nuts 34 and the bolts 32, and resetting the leg members 16 in the next keyhole slots provided. The adjustment is quite simple and requires no special tools, inasmuch as the bolts 32 may be loosened by a small coin, an edge of a detached leg member 16, or the like. The ease of adjustment provided in the present invention discourages disconnecting of the leg members and disposing the trough 12 on bricks, or the like, a practice prevalent where feeders of heretofore known construction are employed, a practice which is not conducive to the proper feeding of the poultry.

The large supporting base portions 54 of the leg members 16 provide means whereby the present feeder may be disposed on wire netting on which thousands of chickens, and the like, are now raised, on floors of straw and other material which may be employed, and on other surfaces through which the supporting legs of feeders heretofore used slip, rendering adjustment useless.

The longitudinal spaces or recesses 24 provide means for cleaning or disinfecting this portion of the trough 12, it being essential to disinfect feeders from time to time. A smooth feeding edge is necessary to prevent feeding poultry from seriously injuring their necks, and in feeders heretofore known, no provision has been made for cleaning the edges of the feeder. The disinfectant or water from a hose easily travels up the face of the body portion 18 and into longitudinal spaces 24.

It is to be understood that the foregoing description and the accompanying drawing have been given only by way of illustration and example. It is manifest that changes in conversions and in materials will be obvious to those skilled in the art, all of which modifications are contemplated as within the scope of the present invention, the present invention being limited only by the claim which follows.

What is claimed is:

A growing feeder comprising, in combination, a trough including ends, a pair of legs at each trough end, each leg being of angle cross section and having a plurality of keyhole slots in one side thereof, each leg including a flat base portion of large supporting area, aligned openings in the trough ends, and a pair of readily removable and replaceable bolts extending through two keyhole slots of each leg and through apertures in said trough ends and secured against removal, said four legs being individually adjustable.

WILLIAM W. FARIS.

REFERENCES CITED

The following references are of record in the file of this patent:

UNITED STATES PATENTS

| Number | Name | Date |
| --- | --- | --- |
| 1,109,009 | O'Brien | Sept. 1, 1914 |
| 1,126,094 | Schaffert | Jan. 26, 1915 |
| 1,500,343 | Southard | July 8, 1924 |
| 1,907,765 | Erickson | May 9, 1933 |
| 2,020,503 | Hanson | Nov. 12, 1935 |
| 2,221,013 | White | Nov. 12, 1940 |
| 2,213,416 | Slawson | Sept. 3, 1940 |
| 2,278,281 | Plante | Mar. 31, 1942 |
| 2,308,701 | Martin | Jan. 19, 1943 |
| 2,320,828 | Murphy | June 1, 1943 |